(12) United States Patent
Idris et al.

(10) Patent No.: US 11,417,171 B2
(45) Date of Patent: Aug. 16, 2022

(54) ARTIFICIAL INTELLIGENCE (AI) IMPLEMENTATIONS FOR PROVIDING GAME RECOMMENDATIONS AT A GAMING DEVICE, AND RELATED SYSTEMS, DEVICES, AND METHODS

(71) Applicant: IGT, Las Vegas, NV (US)

(72) Inventors: Fayez Idris, Dieppe (CA); David Froy, Jr., Lakeville-Westmorland (CA); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 79 days.

(21) Appl. No.: 16/723,139

(22) Filed: Dec. 20, 2019

(65) Prior Publication Data
US 2021/0192884 A1 Jun. 24, 2021

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *G06N 3/04* | (2006.01) |

(52) U.S. Cl.
CPC ............ *G07F 17/323* (2013.01); *G06N 3/04* (2013.01); *G07F 17/3211* (2013.01); *G07F 17/3244* (2013.01)

(58) Field of Classification Search
USPC .................... 463/1, 5, 20, 22, 25, 39, 40, 42
See application file for complete search history.

(56) References Cited

U.S. PATENT DOCUMENTS

| | | | |
|---|---|---|---|
| 9,079,098 B2 | 7/2015 | Gadher | |
| 9,084,932 B2 | 7/2015 | Gadher | |
| 9,289,686 B2 | 3/2016 | Hall et al. | |
| 2007/0054738 A1 | 3/2007 | Muir | |
| 2007/0219000 A1 | 9/2007 | Aida | |
| 2008/0032787 A1 | 2/2008 | Low et al. | |
| 2010/0298040 A1 | 11/2010 | Joshi et al. | |
| 2013/0184070 A1* | 7/2013 | Gadher | .................. G06F 12/00 463/29 |
| 2016/0163158 A1 | 6/2016 | Arnone et al. | |
| 2016/0321855 A1 | 11/2016 | Jordan | |
| 2016/0346687 A1 | 12/2016 | Kerrien et al. | |
| 2018/0001206 A1* | 1/2018 | Osman | ................ A63F 13/5375 |

(Continued)

FOREIGN PATENT DOCUMENTS

WO WO 2009/097538 A1 8/2009

*Primary Examiner* — Adetokunbo O Torimiro
(74) *Attorney, Agent, or Firm* — Sage Patent Group

(57) ABSTRACT

Systems, devices, and methods for artificial intelligence implementation of providing game recommendations at a gaming device may include receive a plurality of first graphical interface elements of a first wagering game. An artificial-intelligence predictive model may generate a plurality of correlations between the plurality of first graphical interface elements and player data associated with a plurality of second graphical interface elements. Based on the plurality of correlations, one or more recommendation score values are generated for the plurality of first graphical interface elements, which may be used to recommend games to a player, to modify user interface elements of existing games, and/or to create new games based on the recommendation score values.

17 Claims, 9 Drawing Sheets

(56) References Cited

U.S. PATENT DOCUMENTS

2018/0349485 A1* 12/2018 Carlisle ................. G06F 16/958
2020/0078679 A1*  3/2020 Dantas de Castro ... A63F 13/67
2021/0260475 A1*  8/2021 Dzjind ................... A63F 13/35

* cited by examiner

300

```
Generate a first video content comprising a plurality of first graphical interface elements of a first
wagering game
302
```
↓
```
Receive player data associated with a plurality of second graphical interface elements
304
```
↓
```
Generate, using an artificial-intelligence predictive model, a plurality of correlations between the
plurality of first graphical interface elements and the player data
306
```
↓
```
Generate, based on the plurality of correlations, a first recommendation score value for the
plurality of first graphical interface elements.
308
```

FIG. 3

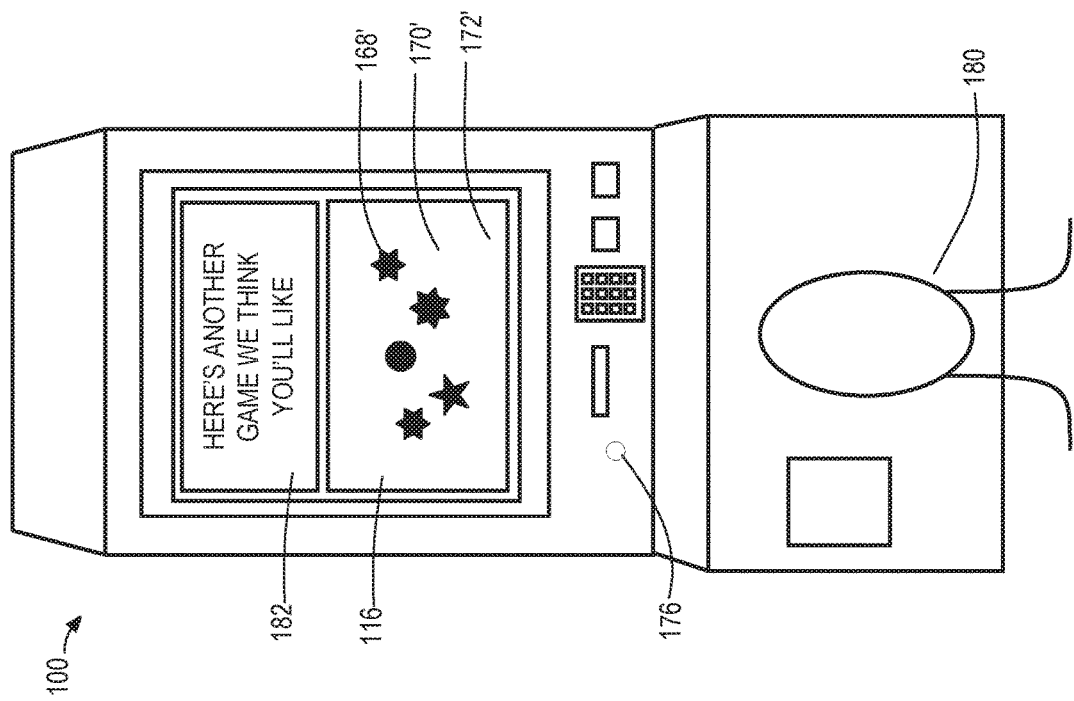
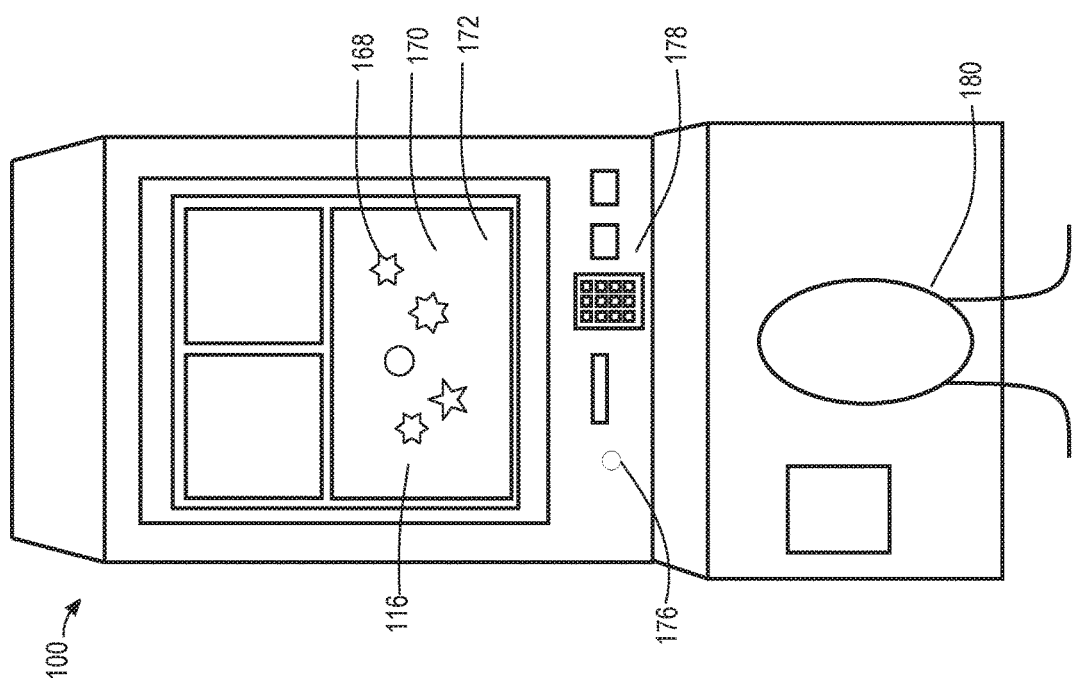

ARTIFICIAL INTELLIGENCE (AI) IMPLEMENTATIONS FOR PROVIDING GAME RECOMMENDATIONS AT A GAMING DEVICE, AND RELATED SYSTEMS, DEVICES, AND METHODS

BACKGROUND

Embodiments relate to providing game recommendations at a gaming device, and more particularly, to artificial intelligence (AI) implementations for providing game recommendations at a gaming device, and related systems, devices, and methods.

Gaming devices, such as electrical and electro-mechanical gaming machines (EGMs) in a casino gaming environment, are systems that allow users to place a wager on the outcome of a random event, such as the spinning of mechanical or virtual reels or wheels, the playing of virtual cards, the rolling of mechanical or virtual dice, the random placement of tiles on a screen, etc. As the number of wagering games and available features at gaming devices increase in number, complexity and sophistication, the number of possible user interface options and feature combinations increases as well.

SUMMARY

According to an embodiment, a system includes a processor circuit and a memory coupled to the processor circuit. The memory includes machine-readable instructions that, when executed by the processor circuit, cause the processor circuit to receive a plurality of first graphical interface elements of a first wagering game. The instructions further cause the processor circuit to generate, using an artificial-intelligence predictive model, a plurality of correlations between the plurality of first graphical interface elements and player data associated with a plurality of second graphical interface elements. The instructions further cause the processor circuit to, based on the plurality of correlations, generate a first recommendation score value for the plurality of first graphical interface elements.

According to another embodiment, a method includes generating a first video content comprising a plurality of first graphical interface elements of a first wagering game. The method further includes receiving player data associated with a plurality of second graphical interface elements. The method further includes generating, using an artificial-intelligence predictive model, a plurality of correlations between the plurality of first graphical interface elements and the player data. The method further includes generating, based on the plurality of correlations, a first recommendation score value for the plurality of first graphical interface elements.

According to another embodiment, a gaming device includes a display device, an image capture device, a processor circuit, and a memory coupled to the processor circuit. The memory includes machine-readable instructions that, when executed by the processor circuit, cause the processor circuit to cause the display device to display a first video content comprising a plurality of first graphical interface elements of a first wagering game. The instructions further cause the processor circuit to cause the image capture device to capture player data associated with a reaction of a player viewing the first video content. The instructions further cause the processor circuit to generate, using an artificial-intelligence predictive model, a plurality of correlations between the plurality of first graphical interface elements and the player data. The instructions further cause the processor circuit to, based on the plurality of correlations, generate a first recommendation score value for the plurality of first graphical interface elements.

BRIEF DESCRIPTION OF THE DRAWINGS

FIG. 3 is a process flow diagram illustrating operations of systems/methods according to various embodiments.

FIGS. 6A-6B illustrate a gaming device for determining player reaction data, game play data, and/or environmental data that may be used by an artificial intelligence predictive model to generate recommendation score values, and for providing game recommendations and/or game modifications based on generated recommendation score values, according to some embodiments.

DETAILED DESCRIPTION

Figure 1A:
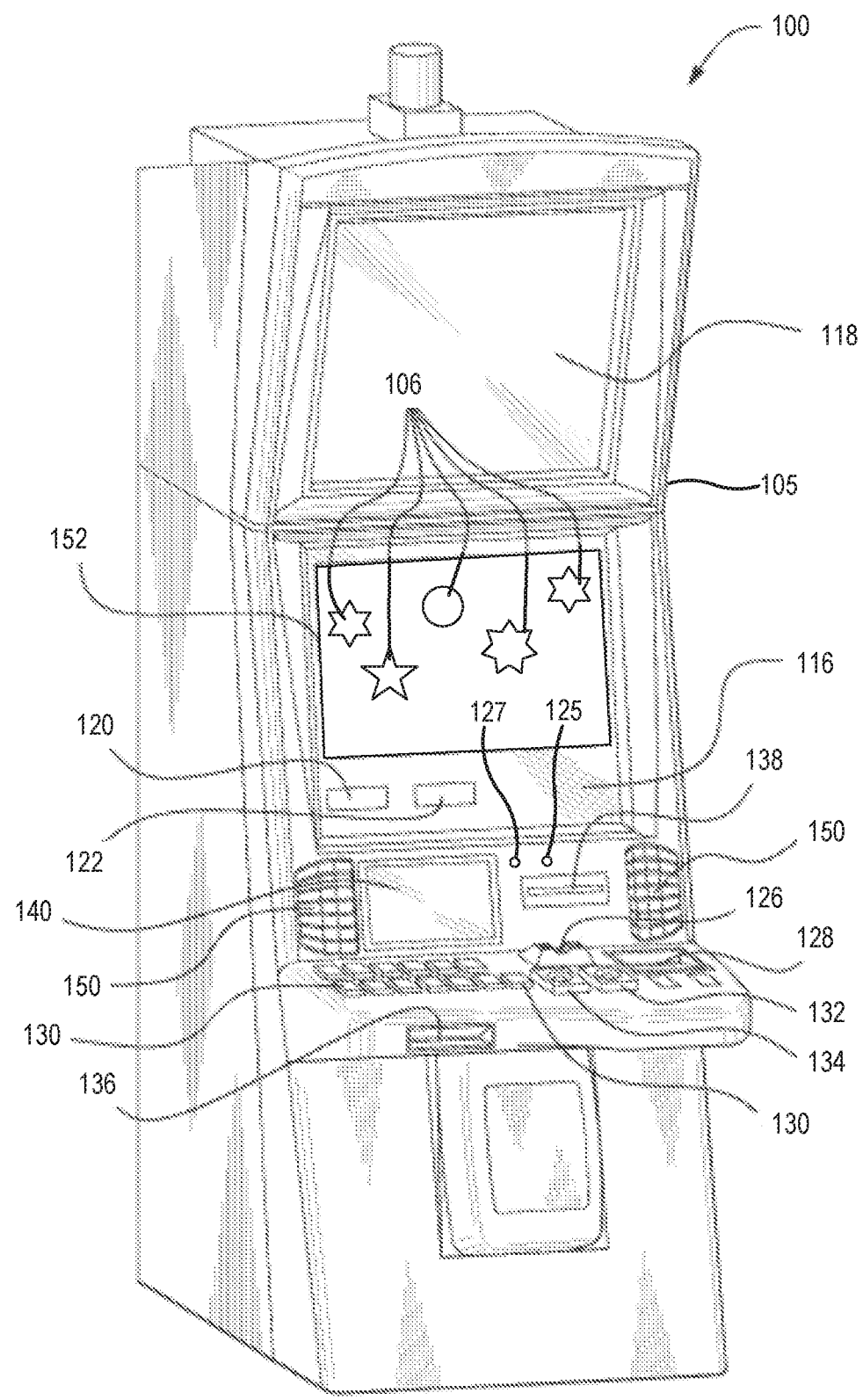
FIG. 1A is a perspective view of an electronic gaming device that can be configured according to some embodiments.

Embodiments relate to providing game recommendations at a gaming device, and more particularly, to artificial intelligence (AI) implementations for providing game recommendations at a gaming device, and related systems, devices, and methods. According to some embodiments, a system receives a plurality of first graphical interface elements of a wagering game, such as through a video stream or other video content of the wagering game. Using an artificial-intelligence predictive model, the system generates correlations between the first graphical interface elements and player data associated with a plurality of second graphical interface elements, such as historical player data relating to graphical interface elements of another wagering game Based on the correlations, the system generates recommendation score values for the plurality of first graphical interface elements, which may be used to recommend particular wagering games to a player, to modify user interface elements of a wagering game for the player, and/or to generate new wagering games.

As will be described in detail below, many different AI predictive models may be used, such as convolutional collaborative filter networks, artificial neural networks, or other types or supervised or unsupervised machine learning techniques. In some embodiments, the AI system performs an analysis of video and/or audio sequences in a video stream (e.g., of a wagering game), and may rank and/or describe a target user and/or demographic for wagering games corresponding to the video stream. The AI system may automatically categorize events and objects within the stream, and may track of the number of times objects and events appear in the video stream, how long they appear, etc. This information can be correlated to player data, such as historical player data, player feedback on individual categorized objects, etc. Individual elements and/or categories of elements may be assigned recommendation score values, which may be used to help cluster particular elements toward different players and/or player demographics.

In some examples, recommendation score values may be generated during the game design process, which may help game designers predict whether a player is going to play a game after the game has been built. Recommendation score values may also help promote and market new and existing games, by predicting which players would be likely to play the game. By obtaining this information early in the design and/or marketing process, game designers may have an opportunity to modify the design of the game to make the game more appealing to targeted players, demographics and/or markets.

Many players are attracted to a particular game based on structural characteristics of the game, such as video and/or audio interface elements, game play features, etc. In some embodiments, a video sequence of user interface elements for a game, such a game trailer for the game, is created. The sequence of user interface elements may include winning spins, losing spins, bonus win, bonus games, and/or other elements, for example. The video sequence can convey a large amount of information about structural characteristics of the game (e.g., elements, colors, layout, sound, etc.).

In some examples, a demo sequence, e.g., for an attract mode, that targets a specific target demographic for the wagering game, may be displayed at a gaming device in a casino environment, for example. Based on player data obtained from the demo sequence, recommendation score values may be generated and used to modify the demo sequence to generate newer attract modes that are more appealing to a target demographic and/or market. In some examples, different attract mode sequences may be generated that target different demographics, with the sequence for each demographic being generated using the analysis of sequences with player data associated with different player demographics, and with recommendation score values based on which elements are the most attractive to each demographic. Different attract mode or other sequences could also be generated based on other factors, such as country, region, date/time, special events, etc. Such generation may be manually initiated, and/or may be automated, with attract mode sequences being modified and refined over time.

In some examples, a game chooser in a multigame environment may display game trailers for the different games. The AI system may receive player data based on player reactions to the different game trailers and/or games and may generate recommendation score values based on the player data. The recommendation score values may be used to rate a player's satisfaction with different games, and/or may be used to present modify the games and/or provide alternative games to the player.

The player data may also include operator data, such as data from casino operators regarding casino player demographics, visitor frequencies and flows, player preferences, behavioral player profiles etc. This data may be used to further refine the recommendation score values and may be used to propose slot-games and configurations (e.g., themes, game math, denomination, placement, etc.) to the casino operator to optimize deployment of games on the slot-floor.

In some embodiments, the AI system may play different wagering games in a simulated or real-time environment, and collect data regarding the individual game elements and/or characteristics and generate recommendation score values. The AI system can then recommend games to players based on the player's-historical play or other data. Recommendation score values relating to aspects of wagering games, such as theme, volatility, character design, art style, type of animations, win presentations, etc., may also be used to aid in game design. In some embodiments, the AI system may design new games automatically based on the recommendation score values for different user interface elements, to appeal to different player demographics.

Electronic Gaming Machines

Figure 1B:
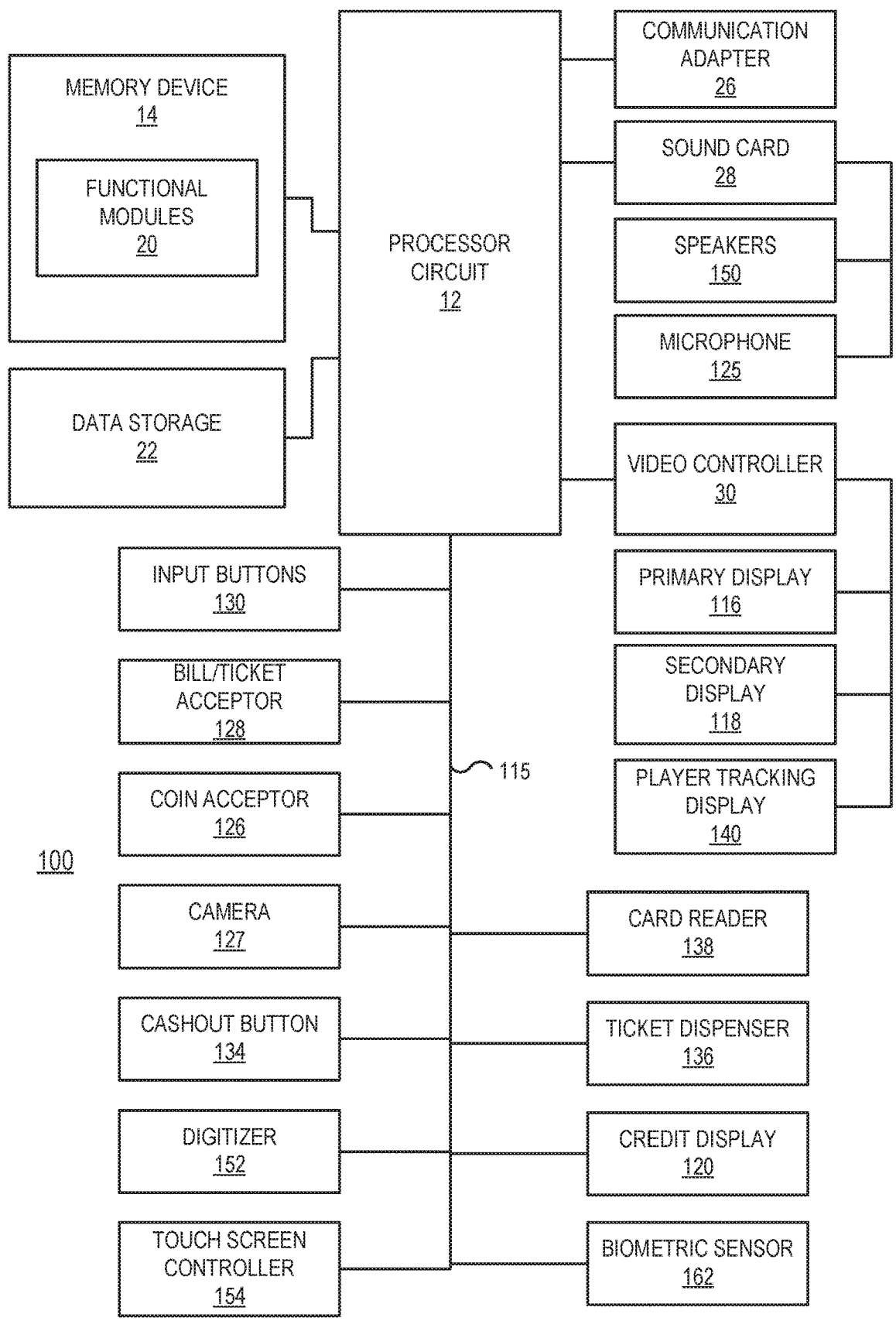
FIG. 1B is a schematic block diagram illustrating an electronic configuration for a gaming device according to some embodiments.
Figure 1C:
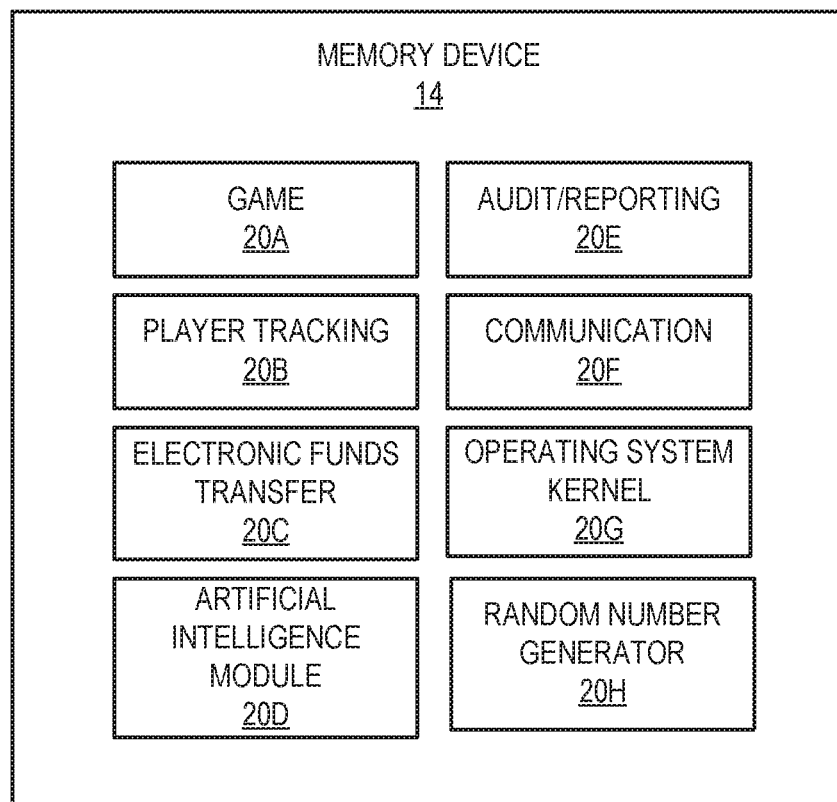
FIGS. 1C and 1D are block diagrams that illustrate various functional modules of an electronic gaming device according to some embodiments.
Figure 1D:
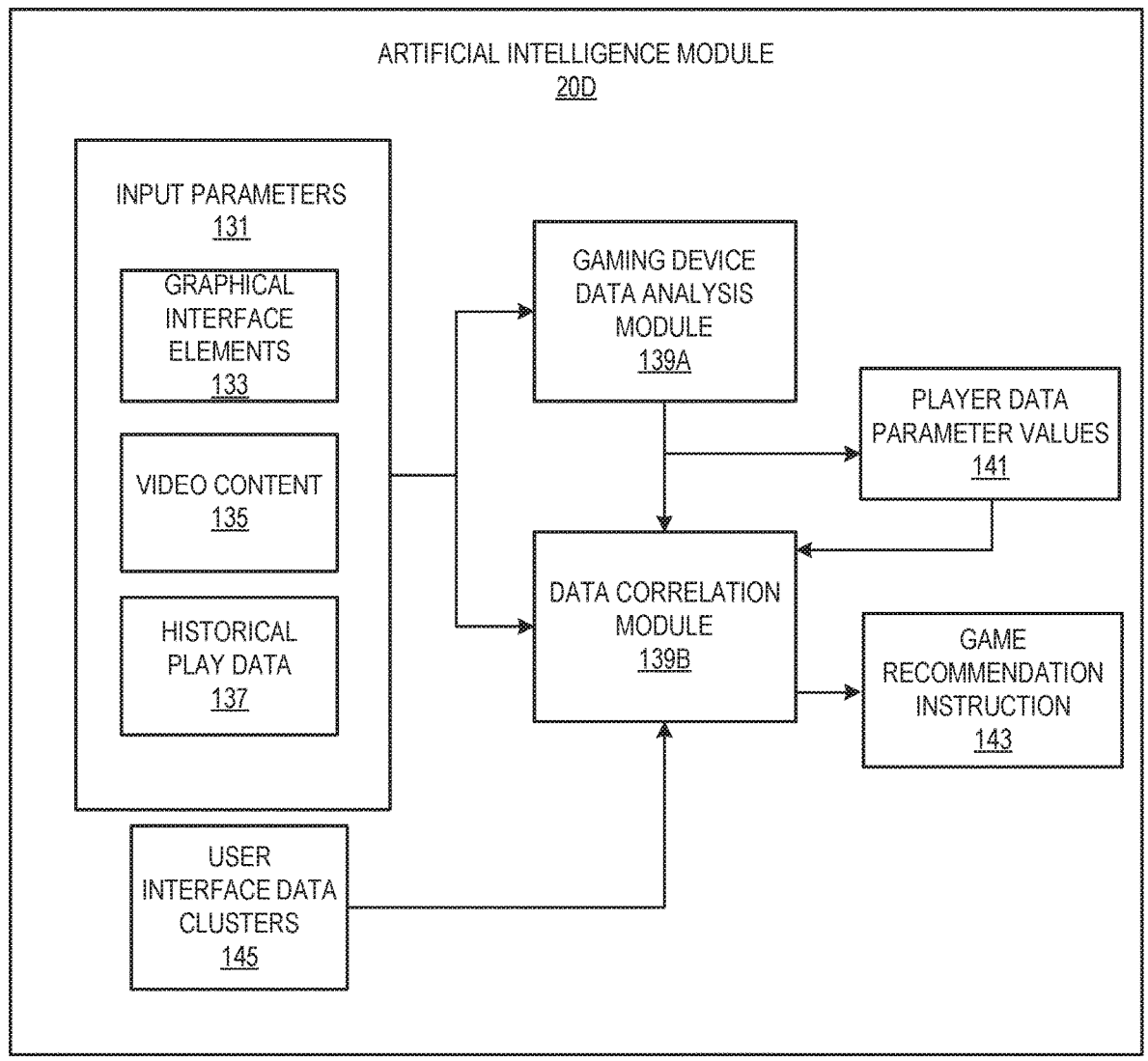

An example of gaming device that can host games according to various embodiments is illustrated in FIGS. 1A, 1B, 1C, and 1D in which FIG. 1A is a perspective view of a gaming device 100 illustrating various physical features of the device, FIG. 1B is a functional block diagram that schematically illustrates an electronic relationship of various elements of the gaming device 100, and FIGS. 1C and 1D illustrate various functional modules that can be stored in a memory device of the gaming device 100. The embodiments shown in FIGS. 1A to 1D are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices typically include a number of standard features, many of which are illustrated in FIGS. 1A and 1B. For example, referring to FIG. 1A, a gaming device 100 may include a support structure, housing or cabinet 105 which provides support for a plurality of displays, inputs, outputs, controls and other features that enable a player to interact with the gaming device 100.

The gaming device 100 illustrated in FIG. 1A includes a number of display devices for presenting user interface elements 106, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The gaming device 100 may further include a player tracking display 122, and a credit display 120. The credit display 120 displays a player's current number of credits, cash, account balance or the equivalent. A bet display that displays a player's amount wagered may be provided separately and/or incorporated into another display.

The player tracking display 122 may be used to display a service window that allows the player to interact with, for example, their player loyalty account to obtain features, bonuses, comps, etc. In other embodiments, additional display screens may be provided beyond those illustrated in FIG. 1A.

The gaming device 100 may further include a number of input devices that allow a player to provide various inputs to the gaming device 100, either before, during or after a game has been played. For example, the gaming device 100 may include a plurality of input buttons 130 that allow the player to select options before, during or after game play. The input buttons 130 may include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 1A and 1B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input devices of the gaming device 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may include a touch-sensitive display that includes a digitizer 152 and a touchscreen controller 154 (FIG. 1B). The player may interact with the gaming device 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 1B, operation of the primary display device 116, the secondary display device 118 and the player tracking display 140 may be controlled by a video controller 30 that receives video data from a processor circuit 12 or directly from a memory device 14 and displays the video data on the display screen. The credit display 120 is typically implemented as simple liquid crystal displays (LCDs) or light emitting diode (LED) displays that display a number of credits available for wagering and a number of credits being wagered on a particular game. Accordingly, the credit display 120 may be driven directly by the processor circuit 12. In some embodiments, however, the credit display 120 may be driven by the video controller 30.

Referring again to FIG. 1A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140, may include flat and/or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display one or more game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a ticket dispenser 136 that is configured to generate and provide a ticket or credit slip representing a payout and/or a credit balance. The ticket or credit slip is printed by the gaming device 100 when the cashout button 134 is pressed, and typically includes a barcode or similar device that allows the ticket to be redeemed via a cashier, a kiosk, or other suitable redemption system, or to be deposited into another gaming machine. The gaming device 100 may further include a bill/ticket acceptor 128 that allows a player to deposit credits in the gaming device 100 in the form of paper money or a ticket/credit slip, and a coin acceptor 126 that allows the player to deposit coins into the gaming device 100. Other means of depositing or crediting monetary value to the player, such as by electronic funds transfer, wireless payment, etc., may be provided.

While not illustrated in FIG. 1A, the gaming device 100 may also include a note dispenser configured to dispense paper currency and/or a coin generator configured to dispense coins or tokens in a coin payout tray.

The gaming device 100 may further include one or more speakers 150 controlled by one or more sound cards 28 (FIG. 1B). The gaming device 100 illustrated in FIG. 1A includes a pair of speakers 150. In other embodiments, additional speakers, such as surround sound speakers, may be provided within or on the cabinet 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 1B is a block diagram that illustrates logical and functional relationships between various components of a gaming device 100. As shown in FIG. 1B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor circuit 12 may further include one or more application-specific integrated circuits (ASICs).

Various components of the gaming device 100 are illustrated in FIG. 1B as being connected to the processor circuit 12. It will be appreciated that the components may be connected to the processor circuit 12 through a system bus 115, a communication bus and controller, such as a USB controller and USB bus, a network interface, or any other suitable type of connection.

The gaming device 100 further includes a memory device 14 that stores one or more functional modules 20.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage device 22, such as a hard disk drive or flash memory. The data storage device 22 may store program data, player data, audit trail data or any other type of data. The data storage device 22 may include a detachable or removable memory device, including, but not limited to, a suitable cartridge, disk, Compact Disc Read-Only Memory (CD-ROM), Digital Versatile Disk (DVD), or Universal Serial Bus (USB) memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface (SCSI) ports, solenoids, speakers, thumb drives, ticket readers, touchscreens, trackballs, touchpads, wheels, and wireless communication devices. In some embodiments, internal or external peripheral devices may communicate with the processor circuit 12 through a USB hub (not shown) connected to the processor circuit 12. U.S. Patent Application Publication No. 2004/0254014 describes a variety of gaming devices including one or more communication ports that enable the gaming devices to communicate and operate with one or more external peripherals.

In some embodiments, the gaming device 100 may include a sensor, such as a camera 127 in communication with the processor circuit 12 (and possibly controlled by the processor circuit 12) that is selectively positioned to acquire an image of a player actively using the gaming device 100 and/or the surrounding area of the gaming device 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor circuit 12 may incorporate that image into the primary and/or secondary game as a game image, symbol or indicia.

The gaming device 100 may further include a microphone 125 connected to the sound card 28 and arranged to pick up sounds generated by the player.

Still referring to FIGS. 1A and 1B, the gaming device 100 may include one or more biometric sensors 162 that can be used to help gauge an emotional state of the player. The biometric sensor 162 may include, for example, a pulse monitor, a respiratory monitor, a blood oxygen level monitor, a body temperature monitor, a stress monitor, etc., that is mounted, for example, on a handle or joystick attached to the gaming device 100.

It will be appreciated that various components illustrated in FIG. 1B may be provided within a single device or within multiple devices. For example, the human input devices illustrated in FIG. 1B (e.g., the displays, input buttons, microphone, speaker, camera, etc., may be provided within a local device and other components, such as the processor circuit, data storage and memory, may be provided in a separate device, such as a remote computing device that communicates with the handheld device over a data communication network or connection including one or more wireless communication links. The local device may, for example, include a handheld device, a desktop device, a tablet computer, etc. In this regard, the local device and/or the remote computing device, alone or together, may be considered to constitute an electronic gaming machine.

Various functional modules of that may be stored in a memory device 14 of a gaming device 100 are illustrated in FIG. 1C. Program code contained in the functional modules controls the processor circuit 12 to perform the functions described herein. Referring to FIG. 1C, the gaming device 100 may include in the memory device 14 a primary game module 20A that includes program instructions and/or data for operating a wagering game as described herein. The gaming device 100 may further include a player tracking module 20B that keeps track of the identity and other information related to the current player, an electronic funds transfer module 20C that manages transfer of credits to/from the player's account, an AI module 20D that receives, analyzes, and correlates gaming device data with data clusters associated with user interface data, an audit/reporting module 20E that generates audit reports of games played on the gaming device 100, a communication module 20F that manages network and local communications of the gaming device 100, an operating system kernel 20G and a random number generator 20H. The electronic funds transfer module 20C communicates with a back-end server or financial institution to transfer funds to and from an account associated with the player. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Referring to FIG. 1D, the AI module 20D may include a gaming device data analysis module 139A and a data correlation module 139B. Each of these modules may utilize various AI implementations, such as an artificial neural network for example, to receive, analyze, and correlate player data with data clusters associated with user interface data, for example to cause a recommendation score value to be generated based on the correlations. For example, the gaming device data analysis module 139A may receive a plurality of input parameters 131 comprising a plurality of interface elements, such as graphical interface elements 133 of a wagering game, which may be provided through user input, video content 135, and/or historical play data 137, which may be provided by events that occur, or that have previously occurred as part of playing a wagering game at the gaming device. The gaming device data analysis module 139A analyzes the player data and the user interface data, and the data correlation module 139B uses a predictive model that includes a plurality of user interface data clusters 145 to correlate the player data parameter values 141 to one or more of the user interface data clusters 145. The data correlation module 139B outputs a game recommendation instruction 143 based on a recommendation score value associated with the correlated user interface data cluster(s) 145.

It should also be understood that may different types of AI may be used in conjunction with or as an alternative to any of the specific embodiments described herein. For example, employing data clustering using artificial neural networks, convolutional collaborative filter networks, or other types of machine learning techniques is one of many types of supervised or unsupervised learning. For example, unsupervised learning, which may generally refer to AI processes that do not require raw input to be pre-categorized or labeled and/or examples of desired output data, may include AI processes such as visualization, clustering, transfer learning, nearest neighbor, deep learning, etc. Supervised learning, which may be used in conjunction with or as an alternative to unsupervised learning, may generally refer to AI processes that may include pre-categorized or labeled data, and may include examples of desired output data, which may guide the AI processes toward an intended result. Examples of supervised learning may include retrieval-based AI or other processes that may employ training data to increase accuracy and efficiency.

These or many other types of AI may be used to implement features of embodiments described herein.

Gaming Device Network System

Figure 2:
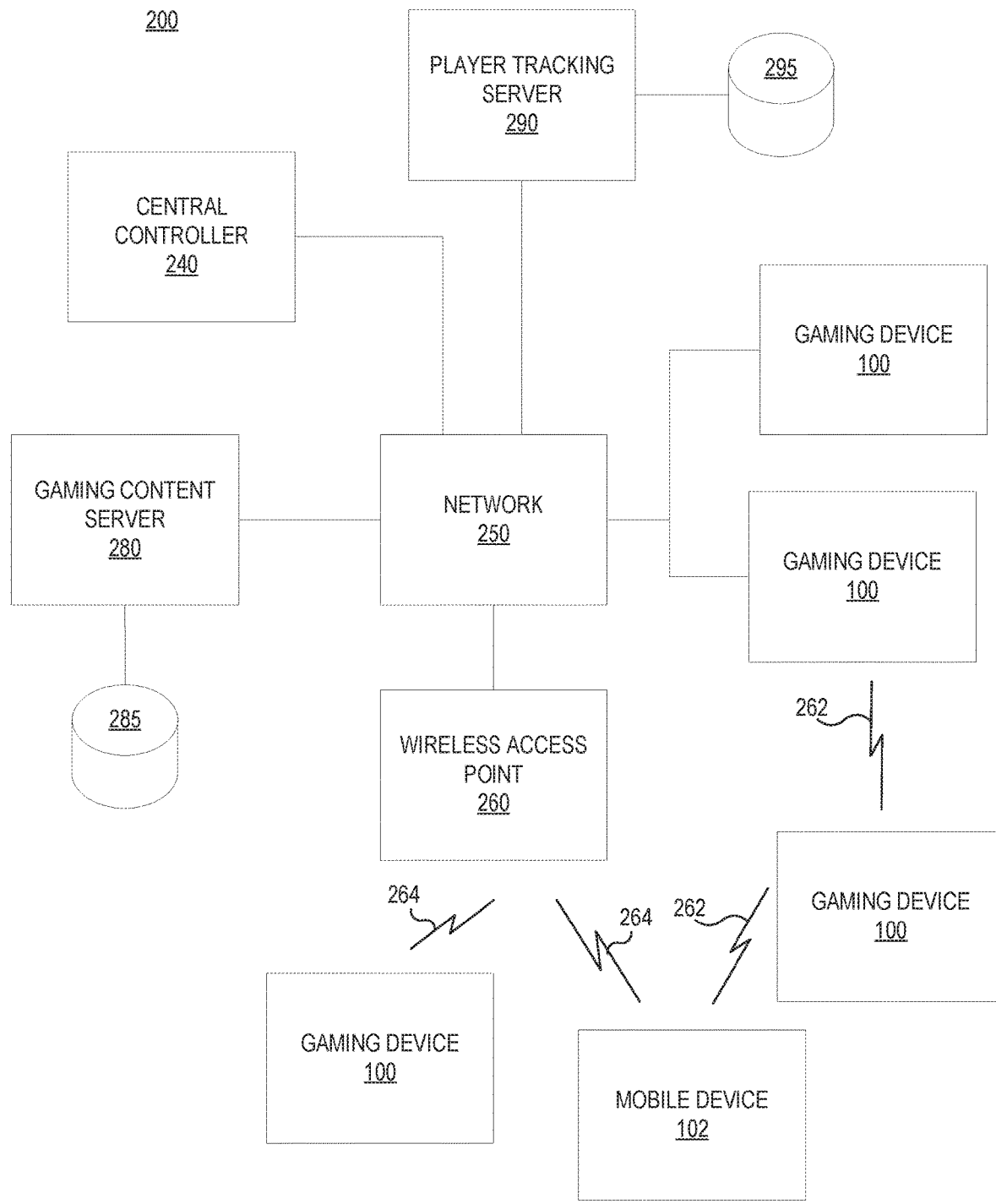
FIG. 2 is a schematic block diagram illustrating a network configuration for a plurality of gaming devices according to some embodiments.

Referring now to FIG. 2, a system 200 including a plurality of gaming devices 100 is illustrated. The system 200 may be located, for example, on the premises of a gaming establishment, such as a casino, in a private residence, or may include components that are located at different locations. In this example, the system 200 also includes one or more mobile devices 102, but it should be understood that many gaming devices 100 and mobile devices 102 may include similar features, so that many gaming devices 100 may also be considered to be mobile devices 102, and many mobile devices 102 may also be considered to be gaming devices 100. The gaming devices 100 and mobile devices 102 may be in communication with each other and/or a central controller 240 through a data communication network 250, or remote communication link. The data communication network 250 may be a private data communication network that is operated, for example, by the gaming facility that operates the gaming device 100 and/or mobile device 102, a publicly accessible data communication network such as the Internet, or a combination thereof. Communications over the data communication network 250 may be encrypted for security. The central controller 240 may be any suitable server or computing device which includes at least one processing circuit, such as a processor, and at least one memory or storage device. Each gaming device 100 and/or mobile device 102 may include a processing circuit that transmits and receives events, messages, commands or any other suitable data or signal between the gaming device 100 and/or mobile device 102 and the central controller 240 and/or other gaming devices 100 and/or mobile devices 102. The gaming device processor is operable to execute such communicated events, messages or commands in conjunction with the operation of the gaming device 100 and/or mobile device 102. Moreover, the processor of the central controller 240 is configured to transmit and receive events, messages, commands or any other suitable data or signal between the central controller 240 and each of the individual gaming devices 100 and/or mobile devices 102. In some embodiments, one or more of the functions of the central controller 240 may be performed by one or more gaming device processors. Moreover, in some embodiments, one or more of the functions of one or more gaming device processors as disclosed herein may be performed by the central controller 240.

A wireless access point 260 provides wireless access to the data communication network 250. The wireless access point 260 may be connected to the data communication network 250 as illustrated in FIG. 2, or may be connected directly to the central controller 240 or another server connected to the data communication network 250.

One or more content servers, such as a gaming content server 280, may also be connected through the data communication network 250. For example, the gaming content server 280 may manage delivery of gaming content to the user of a gaming device 100 and/or mobile device 102 for use as part of a wagering game being played at the gaming device 100 and/or mobile device 102. The gaming content may be stored in a gaming content database 285. The gaming content server 280 may also be implemented within or separately from the central controller 240 and/or other components of the system 200.

A player tracking server 290 may also be connected through the data communication network 250. The player tracking server 290 may manage a player tracking account that tracks the gameplay and spending and/or other player preferences and customizations of a player, i.e., the user of the gaming device 100 and/or mobile device 102, manages loyalty awards for the player, manages funds deposited or advanced on behalf of the player, and other functions. Player information managed by the player tracking server 290 may be stored in a player information database 295.

The gaming devices 100 and/or mobile devices 102 communicate with one or more elements of the system 200 to coordinate providing streaming video content and synchronized gaming content. For example, in some embodiments, a gaming device 100 and/or mobile device 102 may communicate directly with another gaming device 100 and/or mobile device 102 over a wireless interface 262, which may be a WiFi link, a Bluetooth link, an NFC link, etc. In other embodiments, the gaming device 100 and/or mobile device 102 may communicate with the data communication network 250 (and devices connected thereto, including gaming devices) over a wireless interface 264 with the wireless access point 260. The wireless interface 264 may include a WiFi link, a Bluetooth link, an NFC link, etc. In still further embodiments, the gaming device 100 and/or mobile device 102 may communicate with other gaming devices 100, mobile devices 102 or other devices over the wireless interface 262 and the wireless access point 260 over the wireless interface 264. In these embodiments, the wireless interface 262 and the wireless interface 264 may use different communication protocols and/or different communication resources, such as different frequencies, time slots, spreading codes, etc. For example, in some embodiments, the wireless interface 262 may be a Bluetooth link, while the wireless interface 264 may be a WiFi link.

AI-Implemented Game Recommendation Operations

FIG. 3 is a process flow diagram illustrating operations 300 of systems/methods according to various embodiments. In this example, the operations 300 include generating a first video content comprising a plurality of first graphical interface elements of a first wagering game (Block 302). The operations 300 further include receiving player data player data associated with a plurality of second graphical interface elements (Block 304). The operations 300 further include generating, using an artificial-intelligence predictive model, a plurality of correlations between the plurality of first graphical interface elements and the player data (Block 306). The operations 300 further include generating, based on the plurality of correlations, a first recommendation score value for the plurality of first graphical interface elements (Block 308).

In some embodiments, the operations 300 may further include displaying the first video content on a display device of a gaming device. The operations 300 may further include determining a reaction of a player viewing the first video content on the display device, generating player reaction data based on the reaction of the player, and/or generating the first recommendation score value (Block 308) further based on the player reaction data. In some embodiments, the operations 300 may further include displaying, based on the first recommendation score value, an option for the player to play the first wagering game on the display device. Alternatively, or in addition, in some embodiments, the operations 300 may further include, using the artificial-intelligence predictive model, generating, based on the first recommendation score value, a second wagering game comprising a plurality of graphical interface elements.

Artificial Neural Network Model

Many different types of AI may be used to implement the features disclosed herein. For example, in some embodiments, the gaming device data analysis module 139A and/or the data correlation module 139B in FIG. 1D may be implemented using an artificial neural network using data clustering techniques. As discussed above, however, it should be understood that many different types of AI, which may employ supervised learning and/or unsupervised learning processes, may be used in addition to, or as an alternative to, an artificial neural network. As used herein, an artificial neural network may be a computing system having a structure that is inspired by biological neural networks. Such systems may "learn", using data clustering and/or other techniques, how to process input data, such as by considering a priori known examples of input vectors and automatically adapting the network to produce the same results. An artificial neural network is based on a collection of connected units or nodes which act as artificial neurons and are connected by a mesh of connectors which simulate synapses. Each connection between nodes can transmit a signal from one node to another. The artificial neuron that receives the signal can process it and then signal artificial neurons connected to it.

In a typical artificial neural network implementation, the signal at a connection between nodes is a real number, and the output of each node is calculated by a non-linear function of the sum of its inputs. Such a function is referred to herein as a "combinational function" because it combines the outputs of other nodes. Nodes and/or connections typically have a weight that adjusts as learning proceeds. The weight increases or decreases the strength of the signal at a connection. The nodes may have a threshold such that a signal is sent only if the aggregate signal exceeds that threshold. Typically, nodes are organized in layers, where different layers may perform different kinds of transformations on their inputs. Signals travel from the first (input) layer of nodes, to the last (output) layer of nodes. "Learning" or training of artificial neural networks is typically performed by a process of backpropagation in which known outcomes are propagated back through the network, and the weights are adjusted according to a gradient function so that the system produces the known outcome in response to a particular input state, where an "input state" is the vector of input parameter values. Backpropagation can be considered a supervised training technique, because it uses a known output state for each input state that is trained.

Figure 4:
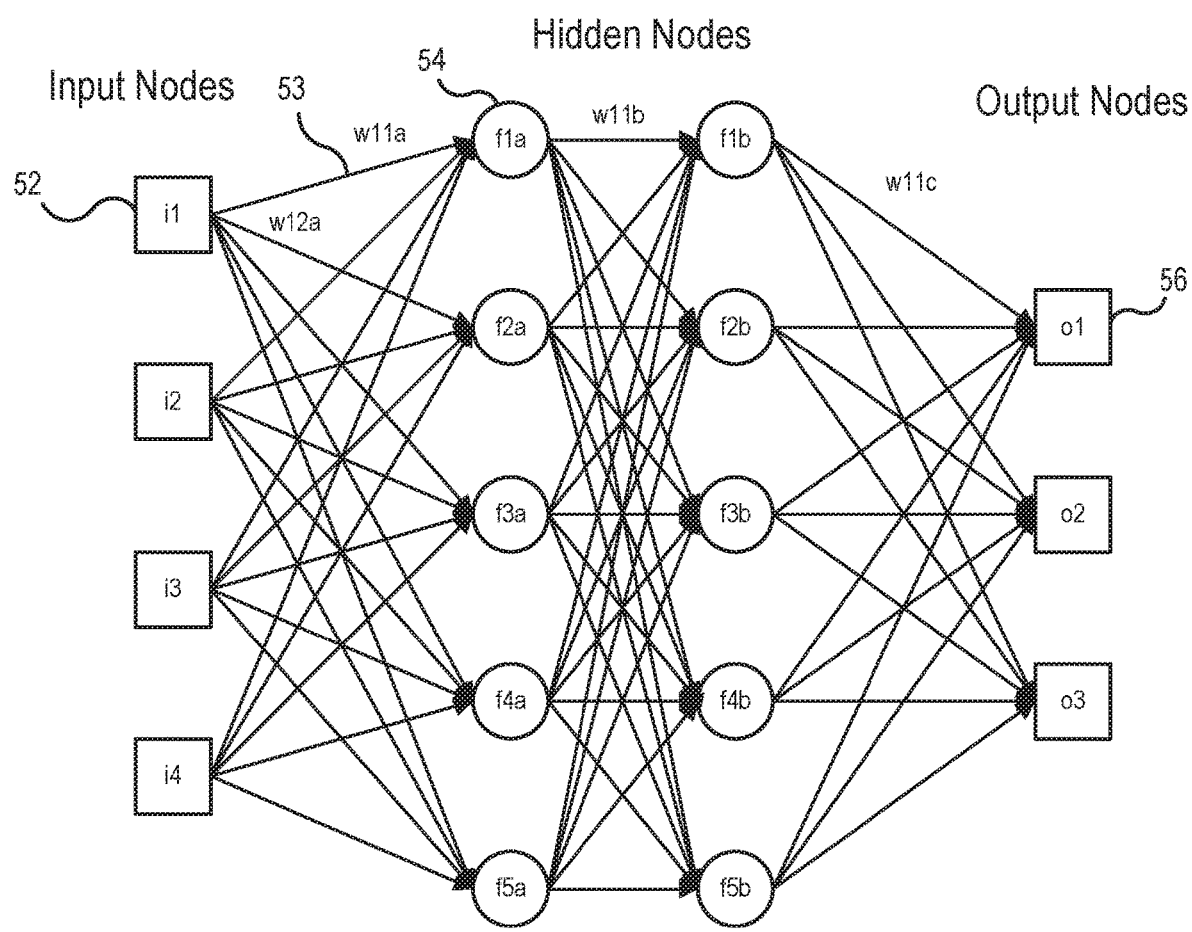
FIG. 4 illustrates a neural network model that may be used to modify user interface elements of a gaming device, according to some embodiments.

A simplified example of an artificial neural network is shown in FIG. 4. Referring to FIG. 4, an artificial neural network includes a plurality of input nodes 52 corresponding to a plurality of input parameters, a plurality of hidden nodes 54 coupled to the plurality of input nodes 52 by means of a plurality of connectors 53, and a plurality of output nodes 56 coupled to the plurality of hidden nodes 54, each of the plurality of hidden nodes having an associated combinational function and each of the connectors having an associated weight. Although two levels of hidden nodes are shown in FIG. 4, more levels of hidden nodes may be provided. Moreover, more or fewer input nodes and/or output nodes may be provided than are shown in FIG. 4.

The inputs may correspond to one or more aspects of the game, the player, the environment, and/or the current game play that are considered to possibly affect or indicate the player's user interface experience. For example, some of the inputs may correspond to biofeedback data obtained from the player, while others may correspond to the level of ambient light or sound, the volume level of the game, the player's win/loss record, most recent game outcome, etc. Each of the inputs is assigned a numerical value at the corresponding input node. A weight is applied to each input parameter when it is propagated to a node at the next level of the model. For example, a weight w11$a$ is applied to the parameter at input node i1 before it is applied to the node f1$a$. Likewise, a weight w12$a$ is applied to the parameter at input node i1 before it is applied to the node f2$a$. At each node, the weighted inputs received at that node are processed by a combinational function, such as f1$a$, f2$a$, etc., and the output of the node is subsequently weighted applied to nodes in the next level. At the output node, the outputs of the hidden nodes are optionally weighted again and combined to provide outputs. It should be understood, however, that other AI techniques may also be used, in addition to, or as an alternative to, the embodiment of FIG. 4.

AI-Implemented Game Recommendation Examples

These and other AI techniques may be used to generate recommendation score values, provide recommendations, generate new wagering games, and other operations, as described herein. These and other AI techniques provide technical solutions to the uniquely challenging technical problems of dynamically providing customized game recommendations for different players in different environments.

Figure 5B:
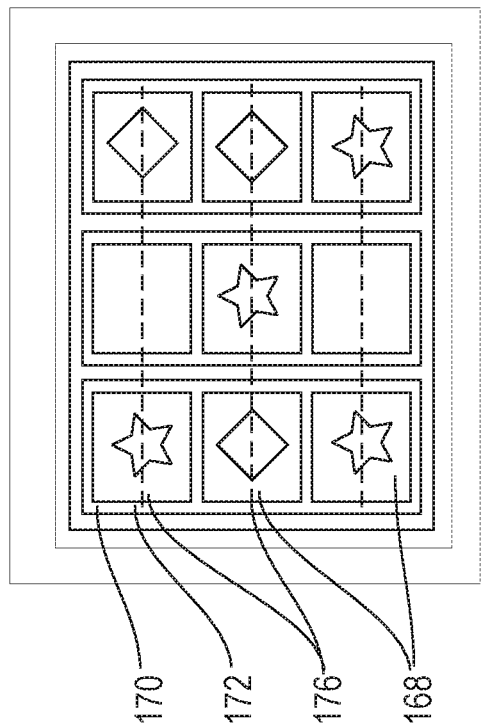
FIGS. 5A and 5B illustrate a graphical user interface of video content including a plurality of graphical interface elements that may be used by an artificial intelligence predictive model to generate recommendation score values for the graphical interface elements, according to some embodiments.
Figure 5A:
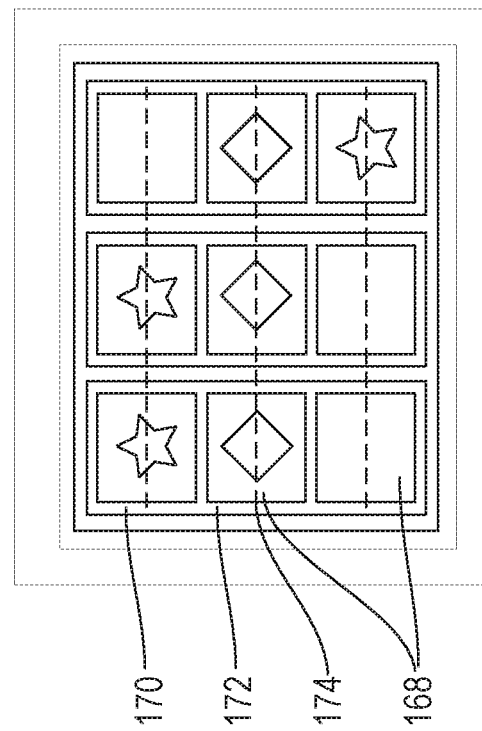

In this regard, FIGS. 5A and 5B illustrate a graphical user interface (GUI) 166 including a plurality of graphical interface elements 168 (e.g., for a wagering game 170) that may be used by an AI predictive model to generate recommendation score values for the graphical interface elements 168. The GUI 166 may be used in connection with any of the devices, systems, and/or operations described herein. In this example, the GUI 166 displays video content 172 that includes the plurality of graphical interface elements 168. For example, the video content 172 is a compilation of graphical interface elements 168 from one or more wagering games, and may include any number of graphical interface elements 168, such as a winning game condition 174 (shown in FIG. 5A), a losing game condition 175 (shown in FIG. 5B), a bonus game, etc., and/or different elements thereof, such as colors, symbols, artwork, animations, video clips, etc. The video content 172 may also include audio elements, haptic elements, and/or other sensory elements, as desired.

Based on the graphical interface elements 168 and/or other elements, an AI predictive model generates a plurality of correlations between the plurality of graphical interface elements 168 and player data associated with a plurality of second graphical interface elements 168. For example, the player data may include historical data associated with a player or group of players, player reaction data, or other data the AI predictive model can correlate to different graphical interface elements 168. Based on the plurality of correlations, a recommendation score values are then generated for the graphical interface elements 168. In some embodiments, groups of graphical interface elements 168 may be associated with one or more recommendation score values, as desired. For example, different types of graphical interface elements 168$a$, 168$b$, etc. may each have different recommendation score values or may have a common recommendation score value, as desired.

In this example, the GUI 166 is provided so that a user may view the graphical interface elements 168, but it should be understood that, in some embodiments, a GUI 166 may not be required for an AI predictive model to generate the plurality of correlations and/or recommendation score values. For example, in some embodiments, the AI predictive model may be able to interpret and/or analyze machine-readable code associated with the graphical interface elements 168 without displaying or otherwise providing the graphical interface elements 168 in an interface that is viewable by a user.

FIGS. 6A and 6B illustrate a gaming device for determining player reaction data, game play data, and/or environmental data that may be used by an AI predictive model to generate recommendation score values, and for providing game recommendations and/or game modifications based on generated recommendation score values. The gaming device 100 may include a display device 116, an image capture device 176, input devices 178, and/or any of the components described above with respect to FIG. 1A-2, et al. In this example, the gaming device 100 includes a processor circuit (not shown) and a memory (not shown) for operating various functions of the gaming device 100.

In this embodiment, as shown in FIG. 6A, the display device 116 displays video content 172 that includes a plurality of graphical interface elements 168 of a wagering game 170, similar to the video content 172 of FIGS. 5A and 5B above, to a player 180 of the gaming device 100. The image capture device 176 and/or other components capture player data associated with a reaction of the player 180 viewing the first video content 172. The processor circuit of the gaming device, or another processor circuit, may then generate, using an artificial-intelligence predictive model, a plurality of correlations between the plurality of graphical interface elements 168 and the player data. Based on the plurality of correlations, recommendation score values for the plurality of graphical interface elements 168 may be generated.

In this example, the player data may be used to determine a reaction of the player 180 viewing the video content 172. Based on the reaction of the player 180, player reaction data may be generated, and the recommendation score value(s) may be generated based in part on the player reaction data. In addition, or alternatively, the player data may include historical play data associated with historical play of the wagering game 170 and/or another wagering game. In some embodiments, the player data may be associated with play of another wagering game different from the wagering game 170, with separate recommendation score values being generated for graphical interface elements of the other wagering game. In some embodiments, the recommendation score values for the graphical interface elements 168 of the wagering game 170 may be generated in part based on the recommendation score values for the graphical interface elements of the different wagering game. In some embodiments, the player data may include historical play data associated with historical play (e.g., wager amount values, win/loss history, etc.) of a second wagering game by the player 180 and/or other players, who may share one or more demographic parameter values (e.g., age, income, player status, player preferences, etc.) with the player 180. In some embodiments, the historical play data may be associated with historical play of the wagering game 170 or another wagering game in a similar gaming environment as the gaming device 100 or in another gaming environment including a plurality of environmental parameter values (e.g., geographical region, type of establishment, date and/or time values associated with the historical play, etc.).

Based on the recommendation score values, the gaming device 100 may recommend games to the player 180. In this regard, FIG. 6B illustrates the display device 116 of the gaming device 100 displaying an option 182 for the player 180 to play the wagering game 170 (or other wagering game). In some embodiments, some or all of the graphical interface elements 168 or other elements of the wagering game 170 may be modified based on the recommendation score values, using the AI predictive model. For example, in this embodiment, aspects of the graphical interface elements 168, such as color, size, brightness, graphical complexity, etc., may be modified to correspond to preferred aspects for the player 180 or the player's demographic, as determined by the AI predictive model based on the player data, player reaction data, historical play data, etc. In some embodiments, the recommendation score values may be used by the AI predictive model to generate new variations of the wagering game 170' with modified user interface elements 168' (e.g., in FIG. 6B) and/or entirely new wagering games.

Additional features and embodiments are also contemplated. For example, a wide variety of sensor hardware may be used to collect player data, including gaze tracking, light sensors, input from game engine software, database lookup, etc. Interface element modifications may include adjustments to brightness, saturation, and/or color profiles, changing size or sharpness of fonts, text, symbols, graphical meters, and/or dynamically adjusting the screen layout and/or interface.

Further Definitions

As used herein, a gaming device includes any electronic device on which an electronic game may be played, including a standalone system such as a slot machine, an electronic gaming machine (EGM), a handheld gaming device, a desktop computing device, mobile computing device or any other computing device on which an electronic game may be played. As will be appreciated by one of skill in the art, disclosed embodiments may be embodied as a method, data processing system, and/or computer program product. Accordingly, embodiments may take the form of an entirely hardware embodiment, an entirely software embodiment or an embodiment combining software and hardware aspects all generally referred to herein as a "circuit" or "module."

Furthermore, embodiments may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, electronic gaming terminals, processor circuits, memory, networks, for example. Components of the computer may include, but are not limited to, a processing unit including a processor circuit, such as a programmable microprocessor or microcontroller, a system memory, and a system bus that couples various system components including the system memory to the processing unit.

The processor circuit may be a multi-core processor including two or more independent processing units. Each of the cores in the processor circuit may support multi-threading operations, i.e., may have the capability to execute multiple processes or threads concurrently. Additionally, the processor circuit may have an on-board memory cache. An example of a suitable multi-core, multithreaded processor circuit is an Intel Core i7-7920HQ processor, which has four cores that support eight threads each and has an 8 megabytes (MB) on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD, or other optical disk storage, magnetic disk storage or other magnetic storage devices, or any other medium which can be used to store the desired information, and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), infrared and other wireless media. Combinations of the any of the above should also be included within the scope of computer readable media.

The system memory includes computer storage media in the form of volatile and/or nonvolatile memory such as read only memory (ROM) and random-access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computer may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computer may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computer may be connected to the LAN through a network interface or adapter. When used in a WAN networking environment, the computer may include a modem or other means for establishing communications over the WAN. The modem, which may be internal or external, may be connected to the system bus via the user input interface, or other appropriate mechanism.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of disclosed embodiments may be written in an object-oriented programming language such as Java®, Smalltalk or C++. However, the computer program code for carrying out operations of disclosed embodiments may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the disclosed embodiments being set forth in the following claims.

What is claimed is:

1. A system comprising:
a processor circuit; and
a memory coupled to the processor circuit, the memory comprising machine-readable instructions that, when executed by the processor circuit, cause the processor circuit to:
receive a first video content of a first wagering game comprising a plurality of first graphical interface elements of a first wagering game;
display the first video content of the first wagering game on a display device of a gaming device;
determine a reaction of a player viewing the first video content on the display device:
generate player reaction data based on the reaction of the player;
generate, using an artificial-intelligence predictive model, a plurality of correlations between the plurality of first graphical interface elements and player data associated with a plurality of second graphical interface elements; and
based on the plurality of correlations and the player reaction data, generate a first recommendation score value for the plurality of first graphical interface elements.

2. The system of claim 1, wherein the machine-readable instructions further cause the processor circuit to:
based on the first recommendation score value, display an option for the player to play the first wagering game on the display device.

3. The system of claim 1, wherein the plurality of second graphical interface elements are associated with a second wagering game, and
wherein the player data comprises historical play data associated with historical play of the second wagering game.

4. The system of claim 3, wherein the machine-readable instructions further cause the processor circuit to:

generate a second recommendation score value for each second graphical interface element of the plurality of second graphical interface elements, and
generate the first recommendation score value for each first graphical interface element further based on the second recommendation score value for a corresponding second graphical interface element.

5. The system of claim 1, wherein the player data comprises historical play data associated with historical play of a second wagering game comprising the plurality of second graphical interface elements by a player, the historical play data comprising a plurality of demographic parameter values.

6. The system of claim 1, wherein the player data comprises historical play data associated with historical play of a second wagering game comprising the plurality of second graphical interface elements at a gaming device, the historical play data comprising a plurality of gaming device parameter values.

7. The system of claim 6, wherein the plurality of gaming device parameter values comprise a wager amount value associated with an average wager amount for wagers placed on the second wagering game during the historical play.

8. The system of claim 1, wherein the player data comprises historical play data associated with historical play of a second wagering game comprising the plurality of second graphical interface elements in a gaming environment, the historical play data comprising a plurality of environmental parameter values.

9. The system of claim 8, wherein the plurality of environmental parameter values comprise a time value associated with a time of a wager placed on the second wagering game during the historical play.

10. The system of claim 1, wherein the machine-readable instructions further cause the processor circuit to:
receive the first recommendation score value at an input layer of the artificial-intelligence predictive model;
based on the first recommendation score value, modify the plurality of first graphical interface elements of the first wagering game; and
display an option for the player to play the first wagering game comprising the plurality of modified first interface elements on the display device.

11. The system of claim 1, wherein the machine-readable instructions further cause the processor circuit to:
receive the first recommendation score value at an input layer of the artificial-intelligence predictive model; and
based on the first recommendation score value, design a second wagering game comprising a plurality of third graphical interface elements.

12. A method comprising:
generating a first video content of a first wagering game comprising a plurality of first graphical interface elements of the first wagering game;
receiving player data associated with a plurality of second graphical interface elements;
generating, using an artificial-intelligence predictive model, a plurality of correlations between the plurality of first graphical interface elements and the player data;
generating, based on the plurality of correlations, a first recommendation score value for the plurality of first graphical interface elements;
receiving the first recommendation score value at an input layer of the artificial-intelligence predictive model; and
designing, based on the first recommendation score value, a second wagering game comprising a plurality of third graphical interface elements.

13. The method of claim 12, further comprising:
displaying the first video content of the first wagering game on a display device of a gaming device;
determining a reaction of a player viewing the first video content on the display device;
generating player reaction data based on the reaction of the player; and
generating the first recommendation score value further based on the player reaction data.

14. The method of claim 13, further comprising:
displaying, based on the first recommendation score value, an option for the player to play the first wagering game on the display device.

15. A gaming device comprising:
a display device;
an image capture device;
a processor circuit; and
a memory coupled to the processor circuit, the memory comprising machine-readable instructions that, when executed by the processor circuit, cause the processor circuit to:
cause the display device to display a first video content comprising a plurality of first graphical interface elements of a first wagering game;
cause the image capture device to capture player data associated with a reaction of a player viewing the first video content;
generate, using an artificial-intelligence predictive model, a plurality of correlations between the plurality of first graphical interface elements and the player data; and
based on the plurality of correlations, generate a first recommendation score value for the plurality of first graphical interface elements.

16. The gaming device of claim 15, wherein the machine-readable instructions that cause the processor circuit to receive the plurality of first graphical interface element further cause the display device to:
display, based on the first recommendation score value, an option for the player to play the first wagering game on the display device.

17. The gaming device of claim 15, wherein the machine-readable instructions further cause the processor circuit to:
receive the first recommendation score value at an input layer of the artificial-intelligence predictive model;
modify, based on the first recommendation score value, the plurality of first graphical interface elements; and
display an option for the player to play the first wagering game comprising the plurality of modified first interface elements on the display device.

* * * * *